United States Patent [19]
Ohta

[11] Patent Number: 5,355,378
[45] Date of Patent: Oct. 11, 1994

[54] PREDICTIVE CODING DEVICE CAPABLE OF CODING IMAGE DATA SIGNALS WITHOUT A DISCONTINUITY AMONG BLOCKS

[75] Inventor: Mutsumi Ohta, Tokyo, Japan

[73] Assignee: NEC Corporation, Japan

[21] Appl. No.: 829,770

[22] Filed: Jan. 31, 1992

[30] Foreign Application Priority Data

Jan. 31, 1991 [JP] Japan ................. 3-031504

[51] Int. Cl.$^5$ ............................................ G06F 11/10
[52] U.S. Cl. .................................. 371/53; 348/413; 348/699; 358/433
[58] Field of Search .................. 371/53, 48; 358/433, 358/430; 348/394, 403, 413, 416, 699; 341/200, 50

[56] References Cited

U.S. PATENT DOCUMENTS

| | | | |
|---|---|---|---|
| 4,727,421 | 2/1988 | Koga | 358/133 |
| 4,800,511 | 1/1989 | Tanaka | 364/521 |
| 4,942,465 | 7/1990 | Ohta | 358/133 |
| 4,942,476 | 7/1990 | Koga et al. | 358/335 |
| 4,969,039 | 10/1990 | Koga et al. | 358/335 |
| 5,046,071 | 9/1991 | Tanoi | 375/27 |
| 5,151,784 | 9/1992 | Lavagetto et al. | 358/136 |
| 5,173,773 | 12/1992 | Ueda et al. | 358/136 |
| 5,177,608 | 1/1993 | Ohki et al. | 358/136 |

OTHER PUBLICATIONS

S. R. Burgett, Multiresolution Multiplicative Autoregressive Coding of Images pp. 276–279 IEEE 1991.

*Primary Examiner*—Robert W. Beausoliel, Jr.
*Assistant Examiner*—Albert Decady
*Attorney, Agent, or Firm*—Ostrolenk, Faber, Gerb & Soffen

[57] ABSTRACT

In a predictive coding device responding to a sequence of image data signals representative of picture elements to produce a sequence of coded output signals, a plurality of provisional error signals are calculated for each picture element from the image data signals and different provisional prediction signals sent from predictors and are given weights in multipliers from a weight decision circuit in consideration of a position of each picture element to produce weighted error signals. The weighted error signals are summed up into a first sum signal by a first adder circuit and thereafter processed into the coded output signals and local decoded signals which are sent to the predictors. The predictors may carry out either different prediction from one another for each picture element or identical prediction in relation to different blocks. Alternatively, a motion vector which is calculated for each block may be smoothed in consideration of the other motion vectors calculated for adjacent blocks on motion-compensated prediction. Thus, weighted means values are calculated as the weighted error signals and/or smoothed motion vector at every picture element so as to mitigate a discontinuity among the blocks.

6 Claims, 3 Drawing Sheets

PREDICTIVE CODING DEVICE CAPABLE OF CODING IMAGE DATA SIGNALS WITHOUT A DISCONTINUITY AMONG BLOCKS

BACKGROUND OF THE INVENTION

This invention relates to a predictive coding device for use in carrying out prediction coding of a sequence of image data signals.

In general, a conventional predictive coding device of the type described is supplied with an image data signal sequence divided into a plurality of blocks and processes the image data signal sequence at every block by the use of efficient coding to produce a sequence of coded output signals. In this event, hybrid coding is very often used as such efficient coding so as to code the image data signal sequence into the coded output signals. In such hybrid coding, predictive coding is at first carried out to obtain a prediction error signal which is thereafter subjected to orthogonal transform. In addition, motion-compensated prediction is also used to obtain a motion vector in the conventional predictive coding device from time to time.

At any rate, processing is mainly finished or completed at every block in the conventional predictive coding device to obtain a result of processing, regardless of processing the other blocks adjacent to every block. For example, the orthogonal transform is carried out at every block and the motion vector is produced at every block.

Under the circumstances, it often happens that the results of processing are different from one another in adjacent ones of the blocks. Such differences bring about a block distortion which is visibly perceptible. Accordingly, a discontinuity is prone to occur at boundaries between the adjacent blocks and results in degradation of an image quality, when such a prediction error signal is reproduced.

In order to improve degradation of the image quality, consideration has been directed to an overlapping technique of blocks with one another so as to remove the discontinuity at the boundaries among the blocks. More specifically, a modulated discrete cosine transform (MDCT) and a lapped orthogonal transform (LOT) have been proposed as such an overlapping technique. In addition, subband coding has been also proposed which analyzes frequencies by the use of a filter.

However, it is difficult to solve the block distortion even when the transform is improved, as mentioned above. This is because block processing is carried out about predictive coding, motion-compensated prediction, and the like, irrespective of the other blocks.

SUMMARY OF THE INVENTION

It is an object of this invention to provide a predictive coding device which is capable of removing a block distortion which might occur in predictive coding.

A predictive coding device to which this invention is applicable is for use in predictively coding a sequence of image data signals into a sequence of coded output signals representative of results of the predictive coding. The image data signal sequence is representative of picture elements divided into a plurality of blocks each of which includes a plurality of the picture elements and which are partially overlapped one another to make each of the picture elements belong to a plurality of the blocks. According to an aspect of this invention, the predictive coding device comprises controllable prediction signal generating means responsive to a local decoded signal in relation to each of the picture elements for generating a plurality of provisional prediction signals calculated for a following one of the picture elements in relation to selected ones of the blocks that include the following one of the picture element, error signal producing means successively supplied with each of the image data signals for the following one of the picture elements and the plurality of the provisional prediction signals for producing a plurality of prediction error signals in parallel. The prediction error signals are representative of differences between each of the image data signals and the plurality of the provisional prediction signals calculated for the selected ones of the blocks. The device further comprises decision means successively supplied with the prediction error signals for deciding optimum prediction signals from the plurality of the provisional prediction signals in connection with the selected ones of the blocks to produce indication signals representative of the optimum prediction signals in the selected ones of the blocks, respectively, generating means for generating location signals representative of locations of the picture elements in the selected ones of the blocks, and weight calculating means successively supplied with the location signals and the indication signals. The weight calculating means is for calculating, for the following one of the picture elements, weighting coefficient signals on the basis of the indication signals. The weighting coefficient signals are representative of weighting coefficients which are to be given to the respective prediction error signals and to the respective provisional prediction signals calculated for the following one of the picture elements in the selected ones of the blocks. The device furthermore comprises first calculation means supplied with the plurality of the prediction error signals and the weighting coefficient signals for calculating intermediate prediction error signals for the following one of the picture elements, second calculation means supplied with the plurality of the provisional prediction signals and the weighting coefficient signals for calculating intermediate prediction signals for the following one of the picture elements, first sum means for summing up the intermediate prediction error signals to produce a first sum signal indicative of a sum of the intermediate prediction error signals, second sum means for summing up the intermediate prediction signals to produce a second sum signal indicative of a sum of the intermediate prediction signals, first converting means for successively converting the first sum signal into each of the coded output signals, second converting means successively supplied with each of the coded output signals for inversely converting the coded output signal into an inversely converted signal, adding means responsive to the second sum signal and the inversely converted signal for adding the second sum signal to the inversely converted signal to produce a third sum signal representative of a sum of the second sum signal and the inversely converted signal, and means for supplying the third sum signal to the controllable prediction signal generating means as the local decoded signal.

A predictive coding device to which this invention is also applicable is for predictively coding a sequence of image data signals by carrying out motion-compensated prediction in relation to each of the image data signals to produce a sequence of coded output signals representative of results of the predictive coding together with an output motion vector signal. The image data signal sequence is representative of picture elements divided into a plurality of blocks which are partially overlapped one another and each of which includes a plurality of the picture elements. According to another aspect of this invention, the predictive coding device comprises detecting means supplied with the image data signal sequence for successively detecting a motion vector information signal representative of a motion vector of each of the blocks, generating means for successively generating location signals representative of locations of the picture elements in each of the blocks and the adjacent one of the blocks, smoothing means supplied with the motion vector information signal and the location signals for smoothing the motion vector information signal on the basis of the location signals to produce a smoothed motion vector signal at every one of the picture elements as the output motion vector signals, a plurality of predictors responsive to the smoothed motion vector signal and a local decoded signal for generating a plurality of provisional prediction signals which are predicted in relation to the smoothed motion vector signal in connection with each picture element belonging to the overlapped blocks, and processing means successively supplied with each of the image data signals and the provisional prediction signals for processing each of the image data signals into the output coded signal and the local decoded signal.

DESCRIPTION OF THE PREFERRED EMBODIMENTS

Figure 1:
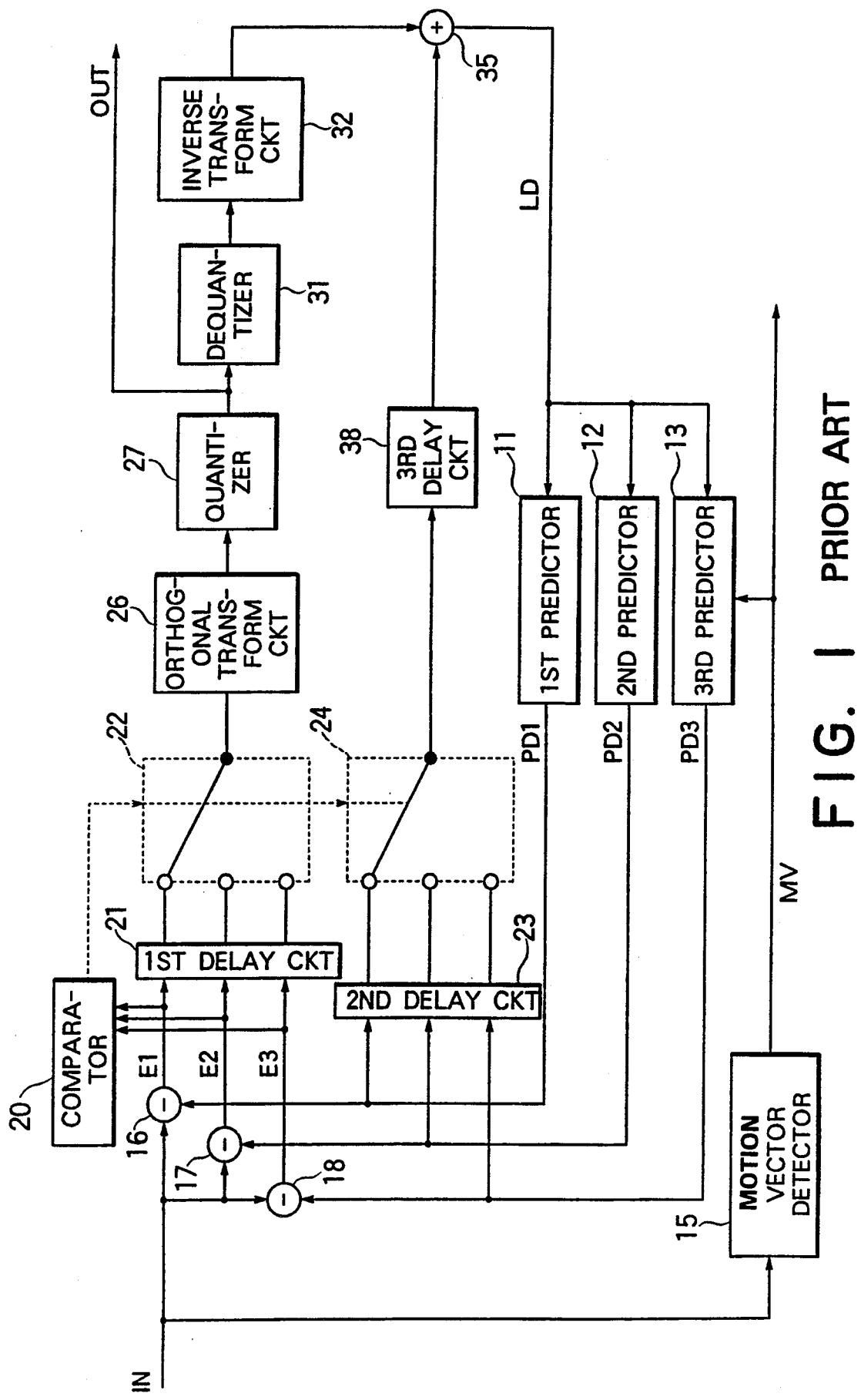
FIG. 1 is a block diagram of a conventional predictive coding device.

Referring to FIG. 1, description will be made about a conventional predictive coding device for a better understanding of this invention. In FIG. 1, the illustrated predictive coding device is a hybrid coding device and is supplied with a sequence of input data signals IN to produce a sequence of coded output signals OUT. The input data signal sequence IN is assumed to be a sequence of image data signals each of which is representative of a picture element. In this connection, the image data signal sequence is divided into a plurality of frames each of which is divided into a plurality of blocks. Each of the blocks is composed of picture elements of, for example, 8×8, 16×16, or the like. For brevity of description, each of the blocks is not overlapped one another and is bordered with adjacent ones of the blocks through boundaries.

In FIG. 1, the predictive coding device comprises first, second, and third predictors 11, 12, and 13 supplied with a local decoded signal LD which is produced in a manner to be described later. The first through the third predictors 11 to 13 may be, for example, an intraframe predictor, an inter-field predictor, and an interframe predictor, respectively. In the example being illustrated, motion-compensated prediction is carried out by the use of a motion vector information signal MV representative of a motion vector. For this purpose, the predictive coding device comprises a motion vector detector 15 operable in response to the image data signal sequence IN to detect the motion vector information signal MV in a known manner and to deliver the motion vector information signal MV to the third predictor 13. In addition, the motion vector information signal MV is produced as an output motion vector signal.

At any rate, the first through the third predictors 11 to 13 produce first, second, and third prediction signals PD1, PD2, and PD3 at every picture element on the basis of the local decoded signal LD, respectively. The first through the third prediction signals PD1 to PD3 may be called first through third provisional prediction signals, respectively, and are representative of results of intraframe, inter-field, and interframe prediction, respectively. The illustrated third provisional prediction signal PD3 is subjected to the motion-compensation in the known manner.

Now, each of the image data signals IN is supplied to first through third subtractors 16, 17, and 18 given the first through the third provisional prediction signals PD1 to PD3, respectively. Let the image data signals IN be successively given at every one of the blocks. The first through the third subtractors 16 to 18 subtract the first through the third provisional prediction signals PD1 to PD3 from each image data signal IN to successively produce first through third error signals $E_1$ to $E_3$ representative of differences between the first through the third provisional prediction signal PD1 to PD3 and each image data signal IN. The first through the third error signals E1 to E3 are successively delivered to a comparator 20 on one hand and to a first delay circuit 21 on the other hand. The first delay circuit 21 has a delay time equal to a block duration for each block and delays the first through the third error signals for each block duration to supply a first switch circuit 22, respectively.

On the other hand, the comparator 20 comprises a buffer successively loaded with the first through the third error signals E1 to E3 for each block duration, a calculation circuit for calculating cumulative values of electric power in relation to the first through the third error signals for each block duration, and a comparison circuit for comparing the cumulative values with one another to select an optimum one of the intraframe, the inter-field, and the interframe prediction. Specifically, the optimum prediction is determined for each block duration by selecting a minimum value from the cumulative values. As a result, the comparator 20 produces an indication signal indicative of the optimum prediction.

The first through the third provisional prediction signals PD1 to PD3 are also successively sent to a second delay circuit 23 which has a delay time equal to that of the first delay circuit 21 and which supplies a second switch circuit 24 with first through third delayed prediction signals.

Supplied with the indication signal, the first switch circuit 22 selects an optimum one of the first through the third delayed error signals as an optimum error signal. Likewise, the second switch circuit 24 selects an optimum one of the first through the third delayed prediction signals in response to the indication signal to produce the optimum delayed prediction signal as the optimum prediction signal. Thus, the optimum prediction is determined at every one of the blocks.

The optimum error signal is subjected to an orthogonal transform by an orthogonal transform circuit 26 and thereafter to quantization by a quantizer 27 to be produced as the coded output signal OUT. The coded output signal OUT is delivered to an external circuit (not shown). On the other hand, the coded output signal OUT is subjected to dequantization by a dequantizer 31 and to inverse transform of the orthogonal transform by an inverse transform circuit 32. Consequently, an inversely transformed error signal is sent from the converter 32 to an adder 35 which is supplied with the optimum prediction signal through a third delay circuit 38. Thus, the adder 38 sums up the inversely converted error signal and the optimum prediction signal to produce a sum signal as the local decoded signal LD. The local decoded signal LD is delivered to the first through the third predictors 11 to 13, as mentioned before.

With this structure, no consideration is made at all about discontinuities at boundaries among the blocks. Therefore, a block distortion inevitably takes place in the illustrated predictive coding device, as mentioned in conjunction with FIG. 1.

Figure 2:
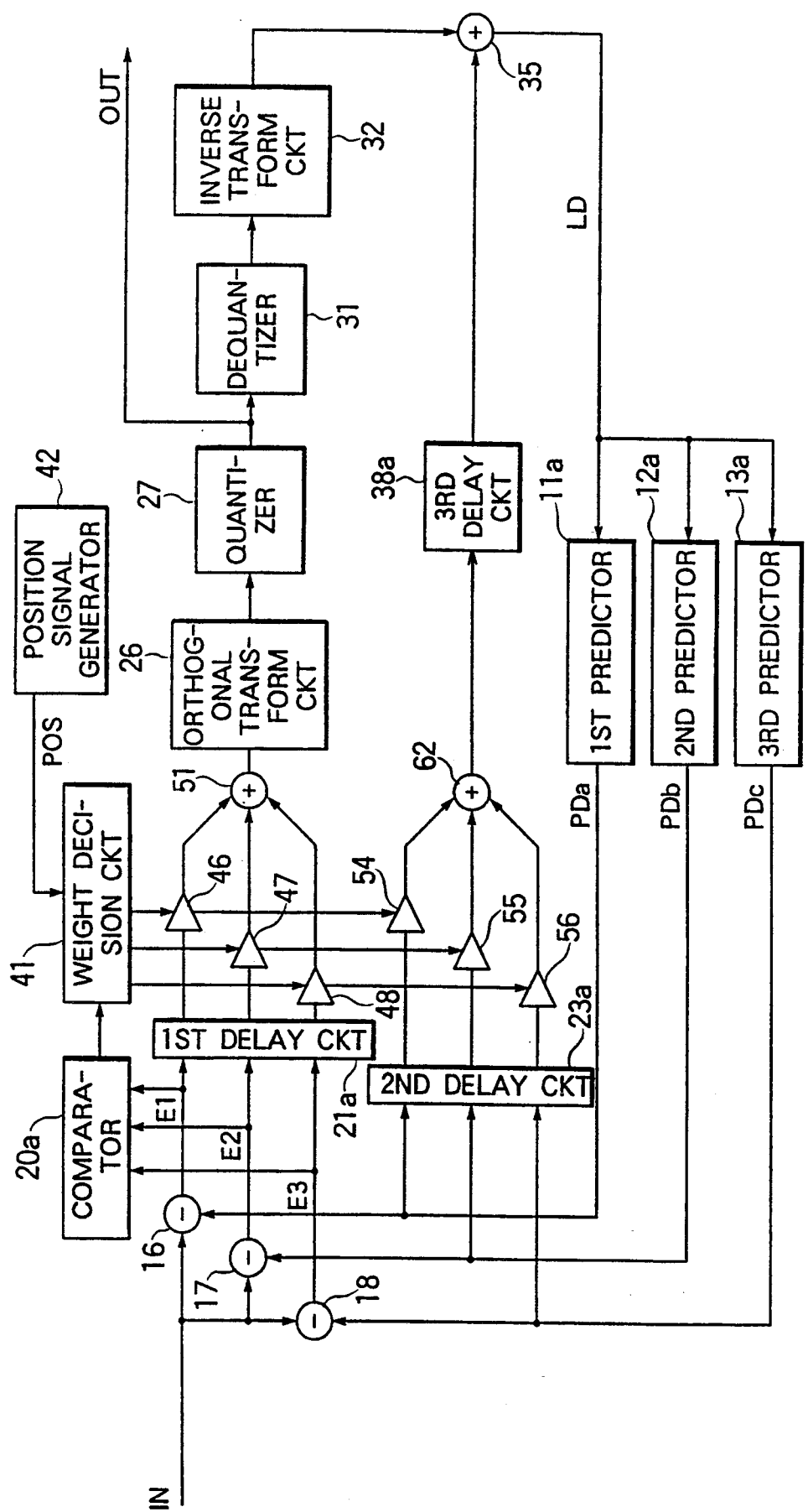
FIG. 2 is a block diagram of a predictive coding device according to a first embodiment of this invention.

Referring to FIG. 2, a predictive coding device according to a first embodiment of this invention comprises similar parts designated by like reference numerals and symbols. In FIG. 2, it is assumed that the image data signals IN are divided into a plurality of blocks each of which is composed of picture elements of, for example, $8 \times 8$, $16 \times 16$, or the like, and which are partially overlapped each other. In this connection, each picture element belongs to a plurality of the blocks different from one another. In the example being illustrated, each picture element is assumed to belong to three different blocks. This shows that each picture element has a weight different from one another in each block. For instance, if a picture element is located at a center position in a certain one of the blocks, the picture element in question is given a heavy weight in the certain block. However, if the picture element under consideration is located at a position adjacent to each boundary of the remaining blocks, light weights are given to the picture element in the remaining blocks.

It is to be noted in FIG. 2 that the motion-compensated prediction is not carried out in the illustrated predictive coding device. Like in FIG. 1, the predictive coding device comprises first through third predictors 11a, 12a, and 13a operable in response to the local decoded signal LD. However, it is noted that the first through the third predictors 11a to 13a carries out predictive coding which is identical with one another and which may be, for example, interframe coding. Such predictive coding is concerned with blocks different from one another. At any rate, the first through the third predictors 11a to 13a successively produce first through third provisional prediction signals PDa, PDb, and PDc in response to the local decoded signal LD. Each of the first through the third provisional prediction signals PDa to PDc is representative of a prediction value for each picture element in three different blocks and is therefore different from one another because each picture element has different weights in the three blocks, as mentioned before.

The first through the third provisional prediction signals PDa to PDc are delivered from the first through the third predictors 11a to 13c to the first through the third subtractors 16 to 18 which are supplied with each of the image data signals IN in common. Like in FIG. 1, the first through the third subtractors 16 to 18 successively produce first through third error signals E1 to E3 representative of differences between each image data signal IN and the first through the third provisional prediction signals PDa to PDc. The first through the third error signals E1 to E3 are successively sent to a comparator 20a and to a first delay circuit 21a. The illustrated first delay circuit 21a delays the first through the third error signals E1 to E3 for three block durations, respectively.

On the other hand, the comparator 20a comprises a buffer memory for storing the first through the third error signals E1 to E3 for three blocks and a calculation circuit for calculating cumulative values of electric power in relation to the first through the third error signals at every one of the three blocks overlapped one another. A comparison circuit compares the cumulative values calculated in relation to the first through the third error signals E1 to E3 with one another at each block to decide first through third optimum ones of the first through the third error signals at every one of the blocks and to produce an indication signal representative of the optimum error signal at each block. The indication signal is successively sent to a weight calculation circuit 41 which is connected to a position signal generator 42 for generating a position or location signal POS representative of a position of each picture element included in each block. Supplied with the position signal POS and the indication signal, the weight calculation circuit 41 calculates weighting coefficients at every one of the picture elements on the basis of the indication signals calculated in relation to the three blocks by the use of a window function (known in the art) and produces weighting coefficient signals indicative of the weighting coefficients. In the illustrated example, the weighting coefficients are selected so that a sum of the weighting coefficients becomes equal to unity. It is to be noted here that one of the weighting coefficients is calculated in relation to a single picture element in one of the blocks while the remaining weighting coefficients are calculated in relation to the remaining picture elements. Each weighting coefficient becomes heavy as the picture element is near to a center of each block.

In the meanwhile, the first through the third error signals E1 to E3 are delivered to a first delay circuit 21a like in FIG. 1. However, the illustrated first delay circuit 21a gives different delays to the first through the third error signals E1 to E3 so that they are simultaneously produced from the first delay circuit 21a and, as a result, concurrently produces first through third delayed error signals which are obtained by delaying the first through the third error signals E1 to E3. The first through the third delayed error signals are supplied to first through third multipliers 46, 47, and 48 which are given the weighting coefficient signals calculated by the weight decision circuit 41. Thus, the first through the third delayed error signals are multiplied by the weighting coefficient signals by the first through the third multipliers 46 to 48 into first through third weighted error signals. The first through the third weighted error signals. The first through the third weighted error signals may be called intermediate prediction error signals. In this connection, a combination of the first delay circuit 21a and the first through the third multipliers 46 to 48 may be referred to as a first calculation circuit for calculating the intermediate prediction error signals.

The first through the third weighted error signals are sent to a first adder 51 to be summed up into a first sum signal which is indicative of a sum of the first through the third weighted error signals.

From this fact, it is readily understood that the first through the third error signals E1 to E3 for each picture element are weighted in consideration of not only a single block but also adjacent blocks and are thereafter summed up. It has been confirmed that such weighting operation is very effective for moderating a discontinuity among the boundaries of the blocks. As a result, it is possible to avoid a rapid change of the prediction error signals between adjacent blocks by slowly changing the weighting coefficients.

Like the first through the third error signals E1 to E3, the first through the third provisional prediction signals PDa to PDc are delivered to fourth through sixth multipliers 54 to 56 through a second delay circuit 23a which is similar to the first delay circuit 21a. Thus, the first through the third provisional prediction signals PDa to PDc are delayed by the second delay circuit 23a and thereafter multiplied in the fourth through the sixth multipliers 54 to 56 by the weighting coefficient signals sent from the weight decision circuit 41. A combination of the second delay circuit 23a and the fourth through the sixth multipliers 54 to 56 may be referred to as a second calculation circuit for calculating first through third weighted prediction signals.

At any rate, the first through the third weighted prediction signals are delivered as intermediate prediction signals from the fourth through the sixth multipliers 54 to 56 to a second adder 62 to be summed up into a second sum signal representative of a sum of the first through the third weighted prediction signals. Like the first through the third error signals E1 to E3, the first through the third provisional prediction signals PDa to PDc are also weighted for every picture element in consideration of not only a single block but also adjacent blocks. Therefore, a discontinuity of the second sum signal among the blocks can be moderated or mitigated in the above-mentioned manner.

Subsequently, the first sum signal is subjected to the orthogonal transform and the quantization by the orthogonal transform circuit 26 and the quantizer 27 and produced as the coded output signal OUT, as mentioned in conjunction with FIG. 1. In addition, the coded output signal OUT is dequantized and inversely transformed by the dequantizer 31 and the inverse transform circuit 32 and is sent as an inversely transformed error signal to the adder 35 which is supplied with the second sum signal through a third delay circuit 38a. The third delay circuit 38a serves to adjust a timing of the second sum signal to that of the inversely transformed error signal. In any event, the adder 35 adds the second sum signal to the inversely transformed error signal to produce the local decoded signal LD, as illustrated in FIG. 1.

In the illustrated example, the first through the third predictors 11a to 13a are assumed to carry out identical prediction in relation to a picture element belonging to different blocks.

According to the inventor's experimental studies, it has been found out that the blocks may not always be overlapped one another and that different prediction may be carried out in the first through the third predictors at every one of the picture elements. In this case also, a discontinuity of the prediction error signals can be mitigated between the blocks. Therefore, each of the first through the third predictors 11a to 13a may be selected from an intraframe predictor, an interframe predictor, an inter-field predictor, an intrafield predictor, and the like.

Figure 3:
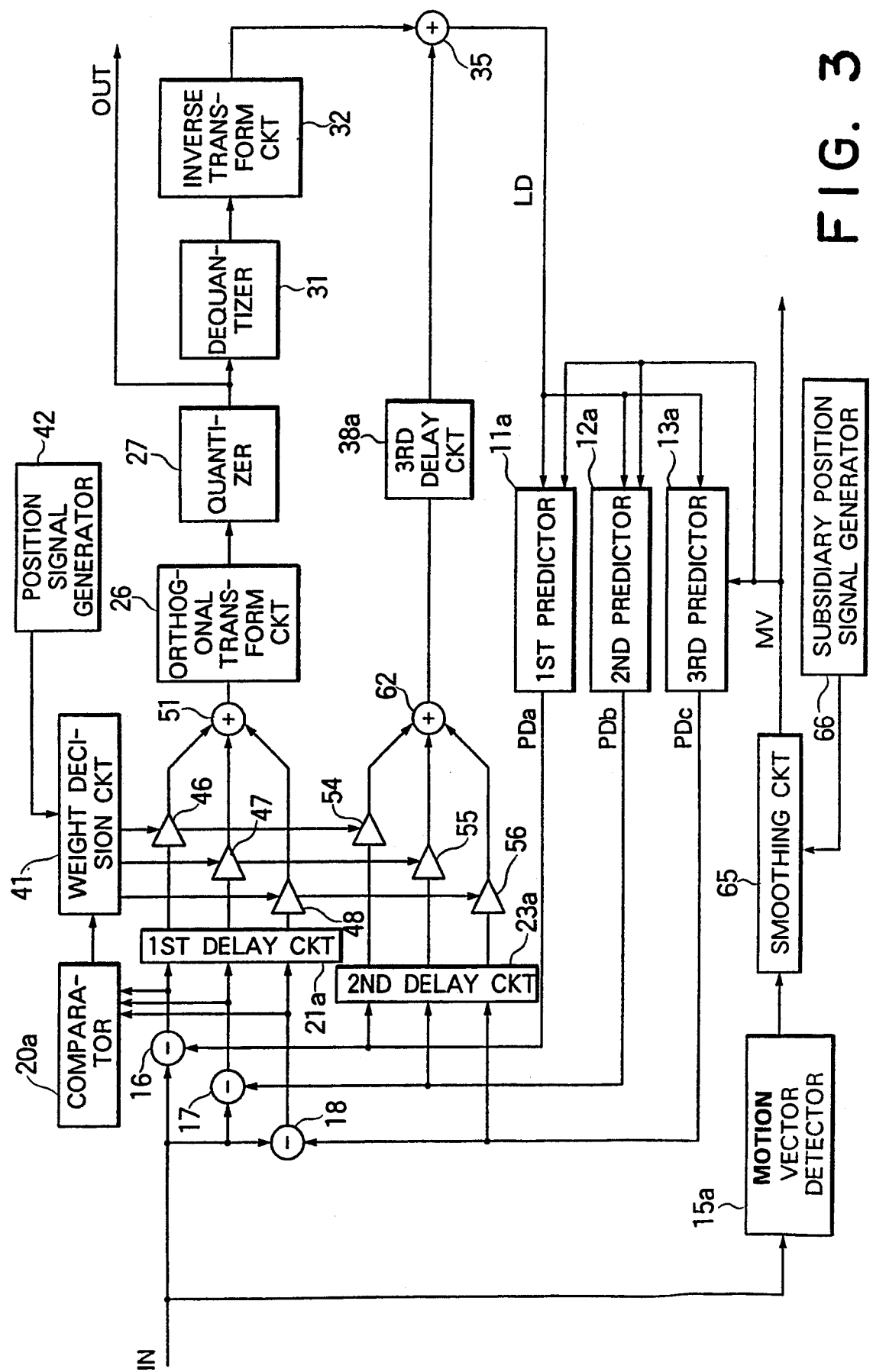
FIG. 3 is a similar diagram of a predictive coding device according to a second embodiment of this invention.

Referring to FIG. 3, a predictive coding device according to a second embodiment of this invention is similar to that illustrated in FIG. 2 except that a smoothing circuit 65 is connected to a motion vector detector 15a and a subsidiary position signal generator 66. Herein, it is assumed that the blocks are overlapped one another like in FIG. 2 and that the first through the third predictors 11a to 13a carries out the same prediction, for example, the interframe prediction for each picture element which is included in different blocks determined by the window function, as mentioned in conjunction with FIG. 2.

With this structure, the illustrated motion vector detector 15a is successively supplied with the image data signals IN for the blocks determined by the window function and successively calculates a motion vector at every block to produce a motion vector information signal indicative of the motion vector. In the example being illustrated, three of the motion vector information signals are calculated for three blocks and sent to a smoothing circuit 65 which is given a position signal standing for each location or position of the picture element in the blocks. Supplied with the position signal and each of the motion vector information signals, the smoothing circuit 65 gives a weight to each of the motion vector information signals to mitigate rapid changes among the blocks. Such an operation can be carried out by smoothing each of the motion information signals in consideration of the remaining motion information signals. In other words, the smoothing circuit 65 may calculate a weighted mean value among the motion vector signals to produce a smoothed motion vector signal MV. The smoothed motion vector signal MV is sent to an external device as an output motion vector signal on one hand and to the first through the third predictors 11a to 13a which is operable in response to the local decoded signal LD.

The first through the third predictors 11a to 13a carry out motion-compensated prediction in response to the local decoded signal LD and the smoothed motion vector signal MV to produce the first through the third provisional prediction signals PDa to PDc. The first through the third provisional prediction signals PDa to PDc are processed by the subtractors 16 to 18, the comparator 20a, the weight decision circuit 41, the multipliers 46 to 48, 54 to 56, the adders 51 and 62, and the like in the manner illustrated with reference to FIG. 2 to produce the coded output signal OUT and the local decoded signal LD. Accordingly, the remaining part except for the predictors 11a to 13a, the smoothing circuit 65, the motion vector detector 15a may be referred to as a processing circuit for producing the coded output signal OUT and the local decoded signal LD.

Although three of the predictors 11a to 13a are included in the illustrated predictive coding device, a single predictor may be controlled by the smoothed motion vector information signal MV. This means that the blocks may not always be overlapped one another.

While this invention has thus far been described in conjunction with a few embodiments thereof, it will readily be possible for those skilled in the art to put this invention into practice in various other manners. For example, four predictors may be used for producing four provisional prediction signals at every one of the picture elements when each picture element belongs to four blocks.

What is claimed is:

1. A predictive coding device for use in predictively coding a sequence of image data signals into a sequence of coded output signals representative of results of the predictive coding, said image data signal sequence being representative of picture elements divided into a plurality of blocks each of which includes a plurality of the picture elements, said predictive coding device comprising:

controllable prediction signal generating means responsive to a local decoded signal in relation to each of said picture elements for generating a plurality of provisional prediction signals for each of said picture elements;

error signal producing means successively supplied with each of the image data signals for said following one of the picture elements and the plurality of said provisional prediction signals for producing a plurality of prediction error signals in parallel, said prediction error signals being representative of differences between each of said image data signals and the plurality of the provisional prediction signals;

decision means successively supplied with the prediction error signals in parallel for deciding an optimum prediction signal at every one of said blocks from the plurality of the provisional prediction signals to successively produce an indication signal representative of said optimum prediction signal at every one of the blocks;

generating means for generating a location signal representative of each location of the picture elements within each block;

weight calculating means successively supplied with said location signal and said indication signal, said weight calculating means being for calculating, for the following one of the picture elements, weighting coefficient signals on the basis of said indication signal, said weighting coefficient signals being representative of weighting coefficients which are to be given to the respective prediction error signals and to the respective provisional prediction signals;

first calculation means supplied with the plurality of the prediction error signals and the weighting coefficient signals for calculating intermediate prediction error signals;

second calculation means supplied with the plurality of the provisional prediction signals and the weighting coefficient signals for calculating intermediate prediction signals for the following one of the picture elements;

first sum means for summing up said intermediate prediction error signals to produce a first sum signal indicative of a sum of said intermediate prediction error signals;

second sum means for summing up said intermediate prediction signals to produce a second sum signal indicative of a sum of said intermediate prediction signals;

first converting means for successively converting said first sum signal into each of said coded output signals;

second converting means successively supplied with each of said coded output signals for inversely converting said coded output signal into an inversely converted signal;

adding means responsive to said second sum signal and said inversely converted signal for adding said second sum signal to said inversely converted signal to produce a third sum signal representative of a sum of said second sum signal and said inversely converted signal; and means for supplying said third sum signal to said controllable prediction signal generating means as said local decoded signal.

2. A predictive coding device for use in predictively coding a sequence of image data signals into a sequence of coded output signals representative of results of the predictive coding, said image data signal sequence being representative of picture elements divided into a plurality of blocks each of which includes a plurality of the picture elements and which are partially overlapped one another to make each of the picture elements belong to a plurality of the blocks, said predictive coding device comprising:

controllable prediction signal generating means responsive to a local decoded signal in relation to each of said picture elements for generating a plurality of provisional prediction signals calculated for a following one of the picture elements in relation to selected ones of the blocks that include the following one of said picture elements;

error signal producing means successively supplied with each of the image data signals for said following one of the picture elements and the plurality of said provisional prediction signals for producing a plurality of prediction error signals in parallel, said prediction error signals being representative of differences between each of said image data signals and the plurality of the provisional prediction signals calculated for the selected ones of the blocks;

decision means successively supplied with the prediction error signals in parallel for deciding optimum prediction signals from the plurality of the provisional prediction signals in connection with said selected ones of the blocks to produce indication signals representative of said optimum prediction signals in said selected ones of the blocks, respectively;

generating means for generating location signals representative of locations of the picture elements in said selected ones of the blocks; weight calculating means successively supplied with said location signals and said indication signals, said weight calculating means being for calculating, for the following one of the picture elements, weighting coefficient signals on the basis of said indication signals, said weighting coefficient signals being representative of weighting coefficients which are to be given to the respective prediction error signals and to the respective provisional prediction signals calculated for the following one of the picture elements in said selected ones of the blocks;

first calculation means supplied with the plurality of the prediction error signals and the weighting coefficient signals for calculating intermediate prediction error signals for the following one of the picture elements;

second calculation means supplied with the plurality of the provisional prediction signals and the weighting coefficient signals for calculating intermediate prediction signals for the following one of the picture elements;

first sum means for summing up said intermediate prediction error signals to produce a first sum signal indicative of a sum of said intermediate prediction error signals;

second sum means for summing up said intermediate prediction signals to produce a second sum signal indicative of a sum of said intermediate prediction signals;

first converting means for successively converting said first sum signal into each of said coded output signals; second converting means successively supplied with each of said coded output signals for inversely converting said coded output signal into an inversely converted signal;

adding means responsive to said second sum signal and said inversely converted signal for adding said second sum signal to said inversely converted signal to produce a third sum signal representative of a sum of said second sum signal and said inversely converted signal; and means for supplying said third sum signal to said controllable prediction signal generating means as said local decoded signal.

3. A predictive coding device as claimed in claim 2 in which the plurality of provisional prediction signals are equal in number to the number of blocks to which each picture element belongs.

4. A predictive coding device for predictively coding, by motion-compensated prediction, a sequence of image data signals to produce a sequence of coded output signals representative of results of the predictive coding together with an output motion vector signal, said image data signal sequence being representative of picture elements divided into a plurality of blocks each of which includes a plurality of the picture elements and which is partitioned by boundaries between each of the blocks and an adjacent one of said blocks, said predictive coding device comprising:

detecting means supplied with said image data signal sequence for successively detecting a motion vector information signal representative of a motion vector of each of said blocks;

generating means for successively generating location signals representative of locations of the picture elements in each of said blocks and said adjacent one of the blocks;

smoothing means supplied with said motion vector information signal and said location signals for smoothing said motion vector information signal along said boundaries on the basis of said location signals to produce a smoothed motion vector signal at every one of said picture elements;

prediction signal generating means responsive to said smoothed motion vector signal and each of said image data signals for generating each of said coded output signals;

means for producing said smoothed motion vector signal as said output motion vector signal.

5. A predictive coding device for predictively coding a sequence of image data signals by carrying out motion-compensated prediction in relation to each of said image data signals to produce a sequence of coded output signals representative of results of the predictive coding together with a output motion vector signal, said image data signal sequence being representative of picture elements divided into a plurality of blocks which are partially overlapped one another and each of which includes a plurality of the picture elements, said predictive coding device comprising:

detecting means supplied with said image data signal sequence for successively detecting a motion vector information signal representative of a motion vector of each of said blocks;

generating means for successively generating location signals representative of locations of the picture elements in each of said blocks and said adjacent one of the blocks;

smoothing means supplied with said motion vector information signal and said location signals for smoothing said motion vector information signal on the basis of said location signals to produce a smoothed motion vector signal at every one of said picture elements as said output motion vector signal;

a plurality of predictors responsive to said smoothed motion vector signal and a local decoded signal for generating a plurality of provisional prediction signals which are predicted in relation to said smoothed motion vector signal in connection with each picture element belonging to the overlapped blocks; and processing means successively supplied with each of said image data signals and said provisional prediction signals for processing each of said image data signals into said output coded signal and said local decoded signal.

6. A predictive coding device as claimed in claim 5 in which each of the picture elements belongs to a plurality of the blocks and the number of predictors is equal in number to the number of blocks to which each picture element belongs.

* * * * *